United States Patent [19]
Dumortier

[11] Patent Number: 5,978,120
[45] Date of Patent: Nov. 2, 1999

[54] OPTICAL SWITCH ARRANGEMENT WITH SYNCHRONISATION FEATURE AND IN PARTICULAR OPTICAL PROTECTION SWITCHING MODULE AND OPTICAL HITLESS PROTECTION SWITCHING MODULE USING SUCH AN ARRANGEMENT AND METHODS REALIZED BY SUCH ARRANGEMENT AND MODULES

[75] Inventor: Philip Vincent Dumortier, Turnhout, Belgium

[73] Assignee: Alcatel, Paris, France

[21] Appl. No.: 08/800,878

[22] Filed: Feb. 14, 1997

[30] Foreign Application Priority Data

Feb. 16, 1996 [EP] European Pat. Off. .............. 96200406

[51] Int. Cl.⁶ .............................. H04J 14/08; H04J 14/02; H04B 10/12

[52] U.S. Cl. .......................... 359/140; 359/117; 359/128; 359/139

[58] Field of Search ..................................... 359/117, 128, 359/139, 140

[56] References Cited

U.S. PATENT DOCUMENTS

| | | | |
|---|---|---|---|
| 5,309,266 | 5/1994 | Jacob et al. .............................. | 359/139 |
| 5,390,178 | 2/1995 | Hunter ..................................... | 359/117 |
| 5,402,256 | 3/1995 | Spanke ..................................... | 359/140 |
| 5,416,769 | 5/1995 | Karol ....................................... | 359/140 |
| 5,469,284 | 11/1995 | Haas ........................................ | 359/140 |
| 5,471,332 | 11/1995 | Shiragaki et al. ....................... | 359/117 |
| 5,734,486 | 3/1998 | Guilemot ................................. | 359/139 |

FOREIGN PATENT DOCUMENTS 0566241 10/1993 European Pat. Off. .
0645652 3/1995 European Pat. Off. .

OTHER PUBLICATIONS

"Transparent routing: the enabling factor towards all –optical networking", by A. Fioretti et al form Alcatel Alsthom Recherche France, ECOC 1994 Florence, Italy, Sept. 1994, pps. 504,509.

*Primary Examiner*—Leslie Pascal
*Attorney, Agent, or Firm*—Ware, Fressola, Van Der Sluys & Adolphson LLP

[57] ABSTRACT

The optical switch arrangement is included in an optical node of an optical network and includes an optical switch (OS) with optical inputs and optical outputs which routes incoming optical signals from the optical inputs to the optical outputs and generates outgoing optical signals. The optical switch arrangement (OSA) additionally includes an optical delay device (ODD) with optical delay units (ODU1, ..., ODU$m$) coupled to a subset of the optical outputs and which delays an outgoing optical signal with a predetermined delay time to generate a delayed optical signal and a control unit (CTRL) to control the routing and the predetermined delay time. The optical switch arrangement (OSA) is thereby enabled to synchronise incoming optical signals. The arrangement is used in an optical protection switching module consisting of the connection of this optical switch arrangement (OSA) and a plurality of optical selectors which select one out of the outgoing optical signals or the delayed optical signals. A second use of the arrangement relates to an optical hitless protection switching module (OHPSW) similar to the previous module but where the optical selectors select one out of a plurality of synchronised outgoing optical signals.

20 Claims, 3 Drawing Sheets

OPTICAL SWITCH ARRANGEMENT WITH SYNCHRONISATION FEATURE AND IN PARTICULAR OPTICAL PROTECTION SWITCHING MODULE AND OPTICAL HITLESS PROTECTION SWITCHING MODULE USING SUCH AN ARRANGEMENT AND METHODS REALIZED BY SUCH ARRANGEMENT AND MODULES

TECHNICAL FIELD

The present invention relates to an optical switch arrangement for inclusion in an optical node of an optical network and including an optical switch with optical inputs and optical outputs, said optical switch being adapted for routing incoming optical signals from said optical inputs to said optical outputs thereby generating outgoing optical signals. It also relates to an optical protection switching module and an optical hitless protection switching module. The invention further relates to optical networks with optical nodes. It still further relates to an optical switching method for use in an optical node of an optical network.

BACKGROUND OF THE INVENTION

Such an optical switch arrangement is already known in the art, e.g. from the article "Transparent routing; the enabling factor towards all-optical networking" written by A. Fioretti, F. Masetti, M. Sotom from Alcatel Alsthom Recherche France, published in the proceeding ECOC 1994, Florence, Italy September 1994. Therein, and more specifically in the paragraph about the functional description of main optical network elements on page 504 and FIG. 3 on page 509, a transparent optical crossconnect is described, which is similar to the above mentioned optical switch arrangement and which provides optical connections by exploiting both wavelength and space domain and reroutes a wide range of incoming optical signals from optical inputs to optical outputs.

Due to increased transmission capacity in optical networks the ability to recover quickly from failures becomes extremely important. A way to prevent failures is to use an optical protection mechanism which explicitly preserves a back-up path for each active path and selects this back-up path in a selector when failure occurs on the active path. However identical optical data travelling over physically diverse optical fiber routes from a source optical node to a destination optical node has different amounts of propagation delay and as a result arrives at a different time in the selector of the destination optical node. For applications providing optical hitless protection switching, i.e. switching between active paths with minimal information loss, identical optical signals coming over different optical paths should arrive at the same time at the selector. However an optical switch arrangement which routes the identical incoming optical signals to the according optical selector can not ensure provision of these optical signals at the same time to the optical selector.

SUMMARY OF THE INVENTION

An object of the present invention is to provide an optical switch arrangement and a method such as the above known ones but which do not have the above drawback, i.e. which are able to provide optical signals at the same time at the optical outputs.

According to the invention, this object is achieved by means of the optical switch arrangement for inclusion in an optical node of an optical network and including an optical switch with optical inputs and optical outputs, the optical switch being adapted for routing incoming optical signals from the optical inputs to the optical outputs thereby, generating outgoing optical signals, characterized in that the optical switch arrangement additionally includes an optical delay device coupled to the optical switch and generating delayed optical signals, the optical delay device including optical delay units, each one of the optical delay units being coupled to a respective optical output of at least a subset of the optical outputs and being adapted to delay an outgoing optical signal of the outgoing optical signals provided at the respective output with a predetermined delay time, thereby generating one of the delayed optical signals; a control unit coupled to the optical switch and to the optical delay device to control the routing and the predetermined delay time respectively, the optical switch arrangement thereby being enabled to synchronise the incoming optical signals and to generate synchronised outgoing optical signals, each one of the synchronised outgoing optical signals being associated with a respective one of the incoming optical signals and being constituted either by a respective one of the outgoing optical signals provided at those optical outputs outside the subset of optical outputs or by a respective one of the delayed optical signals, depending on the routing of the respective incoming optical signal.

It is also achieved by an optical network with optical nodes characterized in that at least one optical node includes at least one optical switch arrangement.

It is still further realized by an optical switching method for use in an optical node of an optical network and comprising the step of routing incoming optical signals from optical inputs to optical outputs of an optical switch, thereby generating outgoing optical signals characterized in that the optical switching method additionally comprises the steps of delaying at least a subset of the outgoing optical signals with predetermined delay times to obtain delayed optical signals, controlling the routing and the predetermined delay times in such a way as to realize synchronisation of the incoming optical signals, thereby generating synchronised outgoing optical signals, each one of the synchronised outgoing optical signals being associated with a respective one of the incoming optical signals and being constituted either by a respective one of the outgoing optical signals outside the subset of outgoing optical signals or by a respective one of the delayed optical signals depending on the routing of the respective incoming optical signal.

Indeed, thanks to the optical delay device included in the optical switch arrangement, leading incoming optical signals can be routed through the optical switch of the arrangement to the optical delay units included in the optical delay device to be delayed with a predetermined delay time which is such that these signals arrive at the outputs of the delay device at the same time as lagging incoming optical signals arriving at the arrangement and being directly routed to the optical outputs. As a result thereof the optical switch arrangement is able to synchronise incoming optical signals and to provide synchronised outgoing optical signals.

Optical delay units which can be controlled to delay a signal with a predetermined delay time are already known in the art, e.g. from the published European patent application EP-0645652—Device to delay an optical signal wherein an optical signal is delayed by means of a wavelength conversion device and a wavelength selective delay line. The exploitation of all-optical wavelength conversion and space division switching in the optical switch means e.g. that the incoming optical signals as well as the outgoing optical signals and the delayed optical signals can be multiplexed or no multiplexed signals. However in this known device, the delay time of the optical signal is controlled in steps as a function of the respective wavelength emitted by the wavelength conversion device, which makes this optical delay unit not suitable for wavelength division multiplexed signals that are to be delayed by the same amount of time. Moreover, the introduced delay on the optical signal by such delay units can only be controlled in a discrete way, since the used wavelengths can only have a limited number of discrete values: a compromise must be made between the range of the delay and the precision of the delay.

Also known as delay unit is a cascade connection of shorter and longer optical delay lines connected by simple optical switches which routes the optical signal through a combination of these delay lines. However in such units a choice must be made between the complexity of the delay unit and the precision and range of the delay.

In a specific network where at installation time of the optical network infrastructure the propagation delay of the optical signals over each optical link between the optical nodes of the optical network are made a multiple of a predetermined time interval the above drawbacks with respect to the delay unit are avoided by the predetermined time interval being an integer multiple of a predetermined time interval. Indeed, the speed of an optical signal travelling through a defined optical medium is constant and consequently also the propagation delay between optical nodes remains constant. Such a specific network as the above described network can be achieved by adding propagation delay so that the total propagation delay between optical nodes is always a multiple of a predetermined time interval. Therefore by making the predetermined delay time of each delay unit also at least one multiple of that predetermined time interval, the predetermined delay time can easily and simply be controlled. Moreover it has to be remarked that with a one-time precise installation of the network and a delay device with a low resolution, i.e. adjustable in large stepwise increments, a large difference in delay range can be covered and a high precision delay adjustment can be made. In addition, in applications such as dynamic reconfiguration of the optical network, a fast delay re-adjustment between the optical active path and a new optical back-up path can easily be performed.

Another characteristic feature of the present invention is that at least part of the optical delay units are coupled back to the optical inputs of the optical switch. As a result the delayed optical signals can be routed repetitively through the optical switch to the optical delay device to realize the necessary delay time. A more intensive use of the optical delay unit is thus possible.

Yet another characteristic feature of the present invention is that each optical delay unit includes an optical fiber delay line with a fiber line length which is an integer multiple of a predefined fiber line length.

The predetermined fiber line length can be defined by the fiber line length of an optical fiber line of which the propagation delay of an optical signal caused by this fiber line equals the predetermined time interval.

The present invention also relates to an optical protection switching module included in an optical node of an optical network and consisting of the cascade connection of the optical switch arrangement and a plurality of optical selectors. This optical protection switching module works following an optical protection mechanism, as described above, under control of e.g. a network management module or a local control unit.

Yet another application of an optical switch arrangement is a an optical hitless protection switching module made in a similar way as described in the previous paragraph. The protection mechanism is hitless because selection is made within synchronised identical incoming optical signals which are thus presented to the optical selector at the same time. As a result, switching between the active paths is possible with minimum interruption.

It should be noted that an errorless line protection apparatus is already known in the art e.g. the published European patent application EP-05662410 A2 Errorless line protection switching in asynchronous transfer mode (ATM) communication systems. However this protection apparatus is not applicable to an all optical environment.

BRIEF DESCRIPTION OF THE DRAWINGS

The above-mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
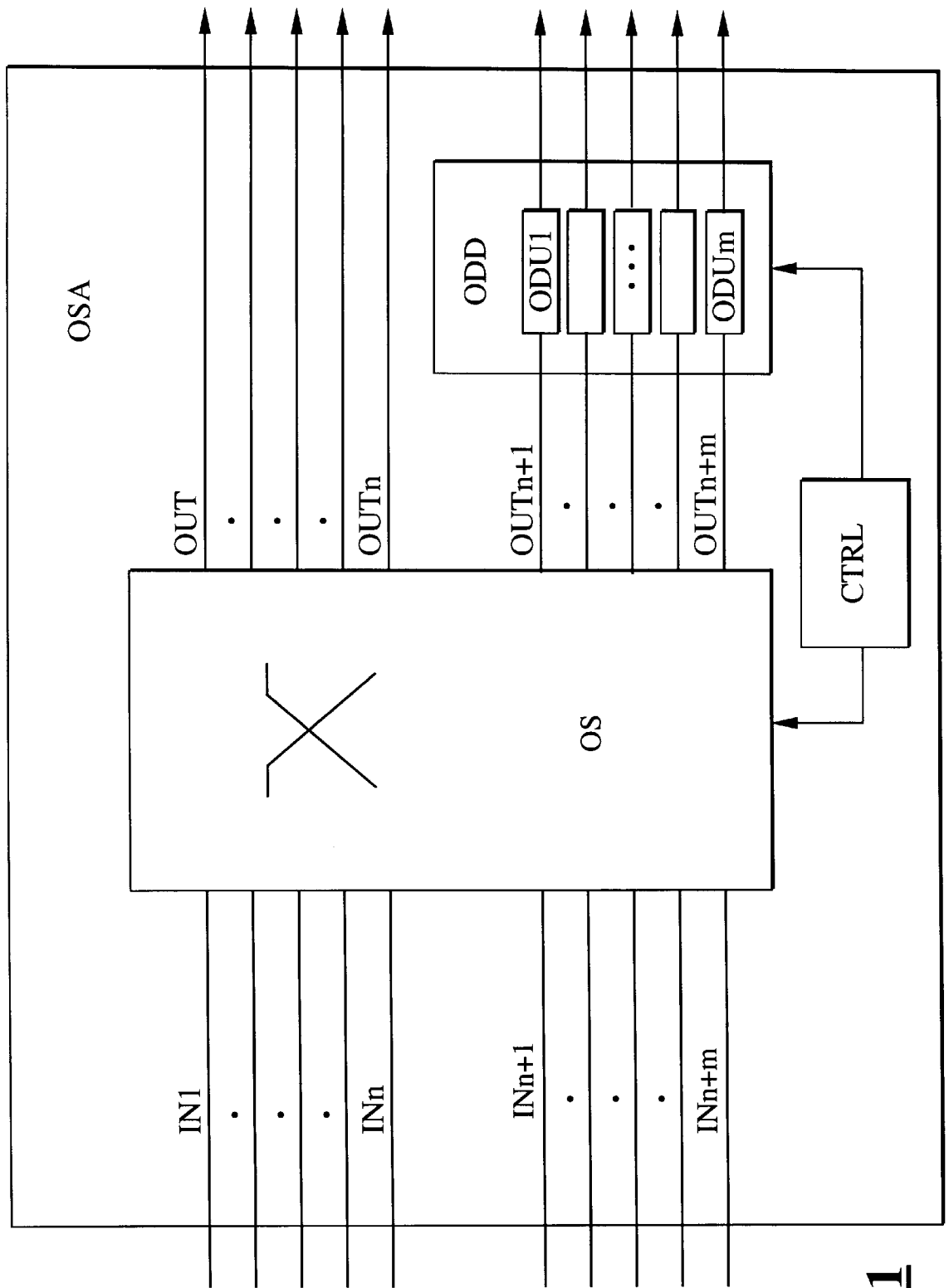
FIG. 1 is a block diagram of a first embodiment of an optical switch arrangement according the present invention.

Referring to FIG. 1 an optical switch arrangement with synchronisation feature will be described. First, the working of the optical switch arrangement will be explained by means of a functional description of the blocks shown in FIG. 1. Based on this description, implementation of the function blocks in FIG. 1 will be apparent to a person skilled in the art and will therefore not be described in detail. In addition, the principle working of the optical switch arrangement will described in further detail.

The optical switch arrangement OSA includes an optical switch OS, and optical delay device ODD and a control Unit CTRL.

The optical switch OS is realised with a transparent optical crossconnect exploiting both wavelength and space domain to route incoming optical signals from optical inputs IN1, . . . , IN$n$, IN$n$+1, . . . , IN$n$+$m$ to optical outputs OUT1, . . . , OUT$n$, OUT$n$+1, . . . , OUT$n$+$m$ and generates outgoing optical signals.

As mentioned before, the incoming optical signals as well as the outgoing optical signals and the delayed optical signals can be multiplexed or not, e.g. in the wavelength domain, which grants the optical nodes including such an optical switch arrangement a high level of transparency to accommodate a wide range of digital signals with different frame formats, coding schemes or bit rates. So, the optical switch arrangement OSA can be preceded or followed by additional multiplexers or wavelength converters to convert the optical signals for additional flexibility in configuring the optical network.

It should be remarked that although in FIG. 1 the number of optical inputs equals the number of optical outputs and that in this description only the routing function of the optical switch OS is explained, it is to be clearly understood that this is no limitation on the invention and that an optical switch OS which includes other functions e.g. for multicasting or a difference in number of inputs and outputs can equally well be used in the optical switch arrangement OSA.

The optical delay device ODD includes optical delay units ODU1, ..., ODU$m$ which are coupled to a respective optical output of a subset of the optical outputs OUT$n+1$, ..., OUT$n+m$ of the optical switch OS to delay outgoing optical signals with a predetermined delay time to generate delayed optical signals and which will be explained more in detail in further paragraphs.

The control unit is coupled to the optical switch OS and the optical delay device ODD to control the routing and the predetermined delay time in response to control data (not shown) provided by the network management and/or created locally.

An incoming optical signal provided at one of the optical inputs IN1, ..., IN$n$, IN$n+1$, ..., IN$n+m$ is routed through the optical switch OS to either an optical output OUT1, ..., OUT$n$ which is not connected to one of the optical delay units or to an optical output OUTN$n+1$, ..., OUT$n+m$ which is connected to one of the optical delay units and delayed with the predetermined delay time.

The optical delay device ODD enables the optical switch arrangement OSA to synchronise incoming optical signals and to provide synchronised outgoing optical signals. Indeed, leading incoming optical signals are, according to the previous paragraph, routed to the optical delay device ODED and delayed with a predetermined delay time which is such that the delayed optical signals are provided at the outputs of the optical delay device ODD at the same time as lagging incoming optical signals which arrive at the arrangement and are routed directly to one of the optical outputs OUT1, ..., OUT$n$ of the optical switch OS.

Figure 4:
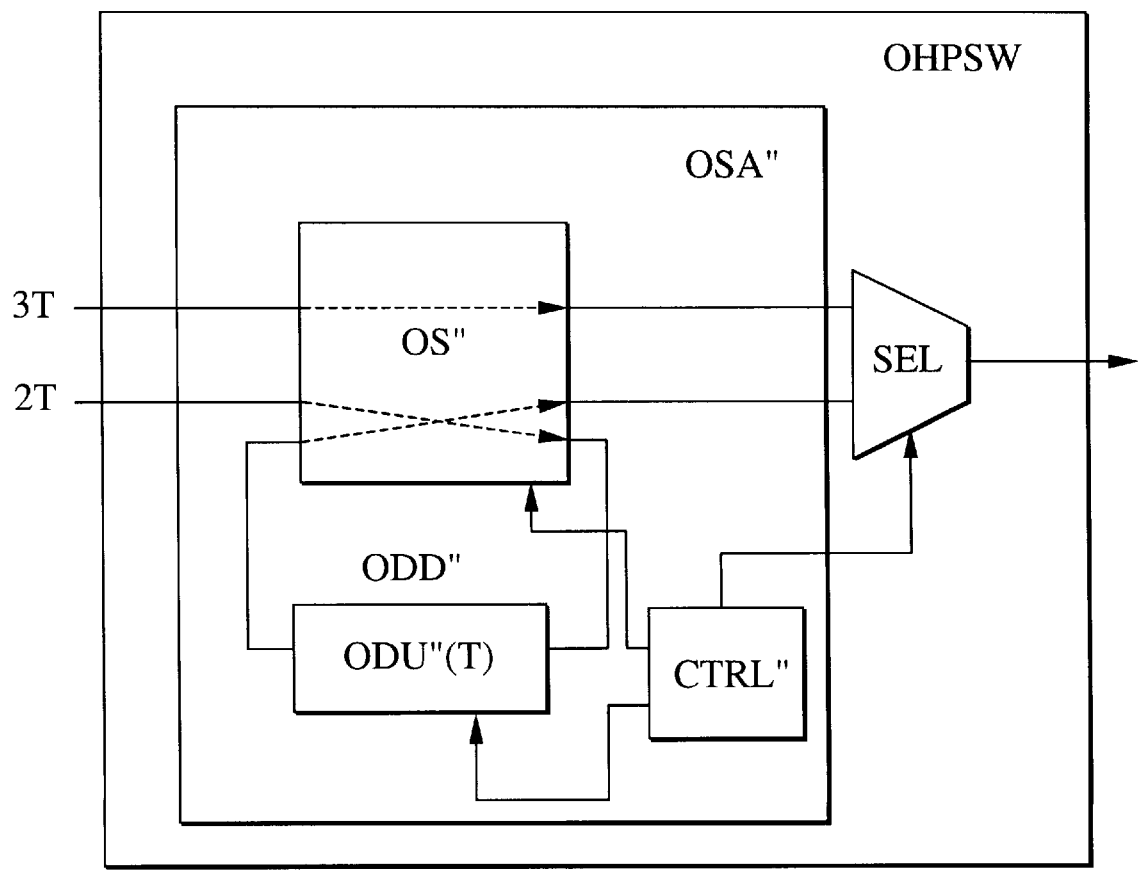
FIG. 4 is a block diagram of an embodiment of part of a specific optical network wherein the module of FIG. 3 is used.

The optical delay units ODU1, ..., ODU$m$ included in the optical delay device ODD can be realised as described above in different ways. However, in a specific network at installation time of the optical network where at installation time of the optical network the propagation delay of the optical signals over each optical link between the optical nodes of the optical network are made, a multiple of a predetermined time interval the optical delay units ODU1, ..., ODU$m$ are realised advantageously according to this embodiment by making the predetermined delay time of each delay unit also a multiple of that predetermined time interval. Part of such a modular network is shown in FIG. 4 and described in the following paragraphs.

In this embodiment the multiple of that predetermined time interval is obtained by including in the optical delay units ODU1, ..., ODU$m$ an optical fiber line with a fiber line length equal to a multiple of a predetermined fiber line length (to avoid overloading the figure the fiber lines are not shown). This predetermined fiber line length corresponds to the fiber line length of an optical fiber line which is such that the transport delay of an optical signal transmitted over this fiber line equals the above predetermined time interval.

The following paragraph is introduced to explain the advantage of the multiple of that predetermined fiber line length regarding the transparency, as mentioned before, of the optical switch arrangement OSA for wavelength multiplexed signals.

As an example, an incoming wavelength multiplexed optical signal of which all wavelength channels need to be delayed by the same multiple of that predetermined time interval can be routed directly, i.e. without wavelength multiplexing or demultiplexing, through the optical switch to thie optical delay device, giving at the output the wavelength multiplexed optical signal with the required delay. In this way, no multiplexing/demultiplexing is needed and the same fiber delay lines are used to delay all wavelength channels.

The order of magnitude of the predetermined time interval can for instance be chosen as 125 microsec. which corresponds—taking into account that optical signals travelling through an optical fiber have a speed of 200000 km/sec.—to a predetermined fiber line length of about 25 km. Inaccuracies due to e.g., influence of the temperature on the optical fiber which gives an inaccuracy of the order of magnitude of a few picosec. or the delay through the optical switch which gives an inaccuracy of the order of magnitude of about 10 nanosec. or a fault of e.g. 1 m at installation of the modular network which gives an inaccuracy of the order of magnitude of about 5 nanosec. are not detrimental to the working of the subject arrangement.

Figure 2:
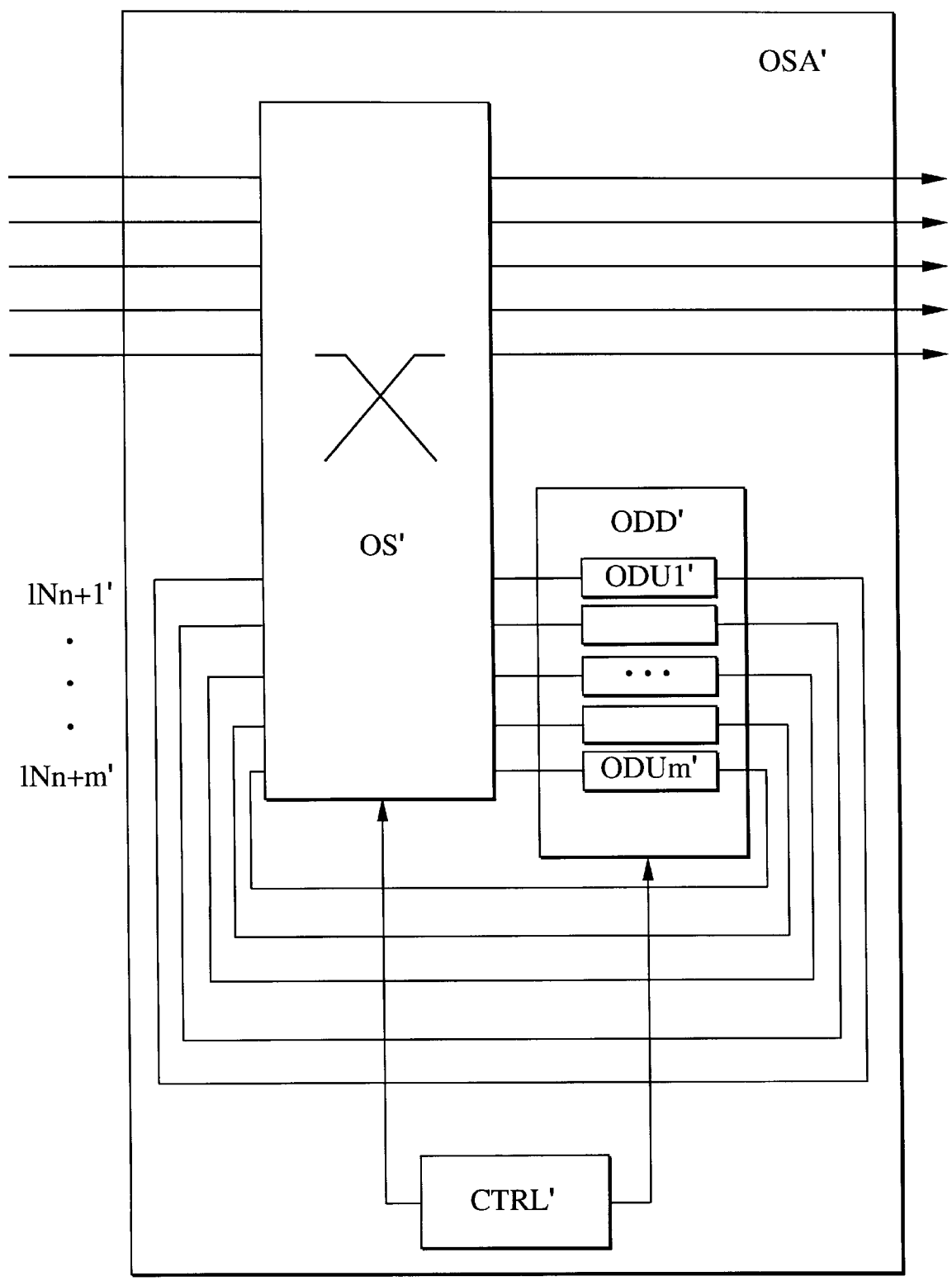
FIG. 2 is a block diagrun of second embodiment of an optical switch arrangement according to the present invention.

Referring to FIG. 2, a second embodiment of an optical switch arrangement with synchronisation feature OSA will be described. Due to similarity with the above first embodiment and taking into account that the functionality of ODD', ODU1', ODU$m$', CTRL', OS', IN$n+1$' and IN$n+m$' shown in FIG. 2 corresponds with the functionality of ODD, ODU1, ODU$m$, CTRL, OS, IN$n+1$ and IN$n+m$ respectively at FIG. 1, the working of the second embodiment of the optical switch arrangement OSA' can be explained by means of a functional description of the blocks shown in FIG. 1 which can be found int he previous paragraphs. Based on this description, implementation of the functional blocks in FIG. 2 will be apparent to a person skilled in the art.

In addition to the optical switch arrangement of OSA of FIG. 1, the OSA' of FIG. includes the coupling back of the optical delay units ODU1', ..., ODU$m$' to the optical inputs IN$n+1$... IN$n+m$' of the optical switch OSA'. As a result, the optical signals can be routed repetitively through the optical switch to the optical delay device ODD' to realise the necessary delay time. It will be apparent for a person skilled in the art that a more intensive use of the optical delay units is possible and that in this way a large amount of optical fiber line is saved.

Figure 3:
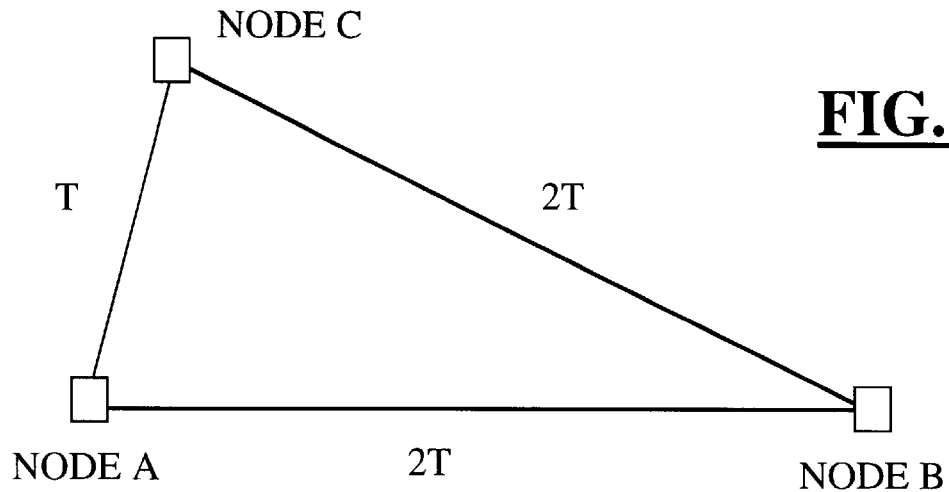
FIG. 3 is a block diagram of an embodiment of an optical hitless protection switching module wherein an optical switch arrangement according to the present invention is used.

Referring to FIG. 3, an optical hitless protection switching module OHPSW will be described wherein an optical switch arrangement OSA" according to the present invention is used. To support this description the block scheme of FIG. 4 is used, OHPSW being part of node B and similar modules being used in the other nodes. To avoid overloading the latter figure a very simple network is chosen. Obviously the invention is not restricted to this simple network.

First, the working of the optical hitless protection switching module OHPSM will be explained by means of a functional description of the blocks shown in FIGS. 3 and 4. Based on this description, implementation of the functional blocks in FIGS. 3 and 4 will be apparent to a person skilled in the art. In addition, the principle working of the optical hitless protection switching module OHPSM will be described in further detail.

The network of FIG. 4 includes three optical nodes: node A as a source node, node B as a destination node and node C. The length of the links between the nodes is chosen so that the transfer delay of an optical signal over each link between two optical nodes is a multiple of a predetermined time interval T: between node A and node B the delay is two times T, between node A and node C the delay is one time T and between node B and node C the delay is two times T.

Node A sends an optical signal called the leading optical signal over an active path directly to node B and sends at the same time the identical optical signal called the lagging optical signal over an active back-up path via node C to node B.

The optical hitless protection switching module OHPSW of FIG. 4 which is included in node B includes an optical switch arrangement OSA" and an optical selector SEL.

The optical switch arrangement OSA" is realised with the second embodiment as described in FIG. 2 taken into account that the functionality of OS", ODD", ODU" and CTRL" shown in FIG. 4 corresponds with the functionality of OS', ODD', ODU' and CTRL' of FIG. 2. According to the invention the optical delay device ODD" includes optical delay units so that the predetermined delay time is a multiple of the predetermined time interval T. The figure shows only one optical delay unit ODU" so that in this particular situation the predetermined delay time equals one time the predetermined time interval T.

The optical selector SEL is coupled to the optical outputs of the optical switch arrangement OSA" and to the optical control unit CTRL". The optical selector SEL selects under control of the control unit CTRL" one out of two synchronised optical signals provided by the optical switch arrangement OSA".

The leading optical signal arrives one time T earlier than the lagging optical signal at the optical switch arrangement OSA". The optical switch arrangement synchronises both signals by routing the leading optical signal to an optical output coupled to the optical delay unit ODU", delaying it with the predetermined delay time which is one time T and routing it to an optical output which is not coupled to the optical delay unit and by routing the lagging optical signal directly to an optical output which is not coupled to the optical delay unit. The leading and lagging optical signals, which include identical information, are thus synchronised and provided to the optical selector SEL. The optical selector SEL selects the optical signal which came over the active path directly from node A to node B and in case of failure of this link, e.g. a cut of the optical fiber, the selector will switch directly to the selection of the optical signal which came over the active backup path without losing any information. How the control unit is informed of the status of the links is a well known network management matter which is not part of the invention, and is therefore not described in detail.

It is noted that the inaccuracy on the hitless switching, resulting from the switching by the selector to another selection, has only an order of magnitude of 10 nanosec.

The present invention is also suited for use in an optical protection switching module. However, such a switching module is not described in detail since the only difference with the application of an optical hitless protection switching module OHPSW, as described in the above paragraphs accompanying FIGS. 3 and 4, is that the optical switch arrangement OSA" is not using the ability to synchronise the identical incoming optical signals.

While the principles of the invention have been described above in connection with specific apparatus, it is to be clearly understood that this description is made only by way of example and not as a limitation on the scope of the invention.

What is claimed is:

1. An optical switch arrangement (OSA) for inclusion in an optical node of an optical network and including an optical switch (OS) with optical inputs (IN1, . . . , IN$n$, IN$n$+1, . . . , IN$n$+$m$) and optical outputs (OUT1, . . . , OUT$n$, OUT$n$+1, . . . , OUT$n$+$m$), said optical switch (OS) being adapted for routing incoming optical signals from said optical inputs (IN1, . . . , IN$n$, IN$n$+1, . . . , IN$n$+$m$) to said optical outputs (OUT1, . . . , OUT$n$, OUT$n$+1, . . . , OUT$n$+$m$) thereby generating outgoing optical signals characterized in that said optical switch arrangement (OSA) additionally includes:

an optical delay device (ODD) coupled to said optical switch (OS) and generating delayed optical signals, said optical delay device (ODD) including optical delay units (ODU1, . . . , ODU$m$), each one of said optical delay units (ODU1, . . . , ODU$m$) being coupled to a respective optical output of at least a subset of said optical outputs (OUT$n$+1, . . . , OUT$n$+$m$) and being adapted to delay an outgoing optical signal of said outgoing optical signals provided at said respective output with a predetermined delay time thereby generating one of said delayed optical signals;

a control unit (CTRL) coupled to said optical switch (OS) and to said optical delay device (ODD) to control said routing and said predetermined delay time respectively so as to provide synchronised outgoing optical signals, each one of said synchronised outgoing optical signals being associated with a respective one of said incoming optical signals, said synchronized optical signals being provided by routing each incoming optical signal either to one of said optical delay units or directly to one of said optical outputs.

2. An optical switch arrangement (OSA) according to claim 1 characterized in that said predetermined delay time is an integer multiple of a predetermined time interval (T).

3. An optical switch arrangement (OSA) according to claim 2 characterized in that each one of said optical delay units (ODU1, . . . , ODU$m$) includes an optical fiber line with a fiber line length being an integer multiple of a predetermined fiber line length.

4. An optical switch arrangement (OSA) according to claim 3 characterized in that said predetermined fiber line length is defined by the fiber line length of an optical fiber line which is such that the transport delay of an optical signal over the fiber line equals said predetermined time interval (T).

5. An optical switch arrangement (OSA) according to claim 1 characterized in that each one of said optical delay units (ODU1, . . . , ODU$m$) includes an optical fiber line with a fiber line length being an integer multiple of a predetermined fiber line length.

6. An optical switch arrangement (OSA) according to claim 4 characterized in that said predetermined fiber line length is defined by the fiber line length of an optical fiber line which is such that the transport delay of an optical signal over the fiber line equals said predetermined time interval (T).

7. An optical switch arrangement (OSA) according to claim 1 characterized in that at least part of said optical delay units (ODU1, . . . , ODU$m$) are coupled back to one of said optical inputs (IN$n$+1, . . . , IN$n$+$m$).

8. An optical network with optical nodes characterized in that at least one optical node of said optical nodes includes at least one optical switch arrangement (OSA) wherein the optical switch arrangement is for inclusion in an optical node of the optical network and including an optical switch (OS) with optical inputs (IN1, . . . , IN$n$, IN$n$+1, . . . , IN$n$+$m$) and optical outputs (OUT1, . . . , OUT$n$, OUT$n$+1, . . . , OUT$n$+$m$), said optical switch (OS) being adapted for routing incoming optical signals from said optical inputs (IN1, ..., INn, INn+1, ..., INn+m) to said optical outputs (OUT1, ..., OUTn, OUTn+1, ..., OUTn+m) thereby generating outgoing optical signals, wherein the optical switch arrangement (OSA) additionally includes:

an optical delay device (ODD) coupled to said optical switch (OS) and generating delayed optical signals, said optical delay device (ODD) including optical delay units (ODU1, ..., ODUm), each one of said optical delay units (ODU1, ..., ODUm) being coupled to a respective optical output of at least a subset of said optical outputs (OUTn+1, ..., OUTn+m) and being adapted to delay an outgoing optical signal of said outgoing optical signals provided at said respective output with a predetermined delay time thereby generating one of said delayed optical signals;

a control unit (CTRL) coupled to said optical switch (OS) and to said optical delay device (ODD) to control said routing and said predetermined delay time respectively so as to provide synchronised outgoing optical signals, each one of said synchronised outgoing optical signals being associated waith a respective one of said incoming optical signals, said synchronized optical signals being provided by routing each incoming optical signal either to one of said optical delay units or directly to one of said optical outputs.

9. An optical network with optical nodes characterized in that at least one optical node of said optical nodes includes at least one optical protection switching module, wherein the optical protection switching module is included in an optical node of the optical network, wherein said optical protection switching module consists of the cascade connection of an optical switch arrangement (OSA), each said optical switch arrangement for inclusion in an optical node of the optical network and including an optical switch (OS) with optical inputs (IN1, ..., INn, INn+1, ..., INn+m) and optical outputs (OUT1, ..., OUTn, OUTn+1, ..., OUTn+m), said optical switch (OS) being adapted for routing incoming optical signals from said optical inputs (IN1, ..., INn, INn+1, ..., INn+m) to said optical outputs (OUT1, ..., OUTn, OUTn+1, ..., OUTn+m) thereby generating outgoing optical signals, wherein the optical switch arrangement (OSA) additionally includes:

an optical delay device (ODD) coupled to said optical switch (OS) and generating delayed optical signals, said optical delay device (ODD) including optical delay units (ODU1, ..., ODUm), each one of said optical delay units (ODU1, ..., ODUm) being coupled to a respective optical output of at least a subset of said optical outputs (OUTn+1, ..., OUTn+m) and being adapted to delay an outgoing optical signal of said outgoing optical signals provided at said respective output with a predetermined delay time thereby generating one of said delayed optical signals;

a control unit (CTRL) coupled to said optical switch (OS) and to said optical delay device (ODD) to control said routing and said predetermined delay time respectively so as to provide synchronised outgoing optical signals, each one of said synchronised outgoing optical signals being associated with a respective one of said incoming optical signals, said synchronized optical signals being provided by routing each incoming optical signal either to one of said optical delay units or directly to one of said optical outputs; and a plurality of optical selectors, each optical selector being adapted to select under control of a second control unit, one out of a plurality of said outgoing optical signals or said delayed optical signals generated by said optical switch arrangement (OSA), thereby generating a selected optical signal, said plurality of said outgoing optical signals or of said delayed optical signals corresponding to a plurality of identical incoming optical signals.

10. An optical network with optical nodes characterized in that at least one optical node of said optical nodes includes at least one optical hitless protection switching module (OHPSW), wherein the optical hitless protection switching module is included in an optical node of the optical network, wherein said optical hitless protection switching module (OHPSW) includes the cascade connection of an optical switch arrangement (OSA), wherein the optical switching arrangement is for inclusion in an optical node of the optical network and including an optical switch (OS) with optical inputs (IN1, ..., INn, INn+1, ..., INn+m) and optical outputs (OUT1, ..., OUTn, OUTn+1, ..., OUTn+m), said optical switch (OS) being adapted for routing incoming optical signals from said optical inputs (IN1, ..., INn, INn+1, ..., INn+m) to said optical outputs (OUT1, ..., OUTn, OUTn+1, ..., OUTn+m) thereby generating outgoing optical signals, wherein the optical switch arrangement (OSA) additionally includes:

an optical delay device (ODD) coupled to said optical switch (OS) and generating delayed optical signals, said optical delay device (ODD) including optical delay units (ODU1, ..., ODUm), each one of said optical delay units (ODU1, ..., ODUm) being coupled to a respective optical output of at least a subset of said optical outputs (OUTn+1, ..., OUTn+m) and being adapted to delay an outgoing optical signal of said outgoing optical signals provided at said respective output with a predetermined delay time thereby generating one of said delayed optical signals;

a control unit (CTRL) coupled to said optical switch (OS) and to said optical delay device (ODD) to control said routing and said predetermined delay time respectively so as to provide synchronised outgoing optical signals, each one of said synchronised outgoing optical signals being associated with a respective one of said incoming optical signals, said synchronized optical signals being provided by routing each incoming optical signal either to one of said optical delay units or directly to one of said optical outputs;

and wherein the optical hitless protection module further includes a plurality of optical selectors, each optical selector (SEL) being adapted to selects under control of a second control unit, one out of a plurality of said synchronised outgoing optical signals generated by said optical switch arrangement (OSA), thereby generating a selected optical signal, said plurality of synchronised outgoing optical signals corresponding to a plurality of identical incoming optical signals.

11. An optical switching method for use in an optical node of an optical network and comprising the step of routing incoming optical signals from optical inputs (IN1, ... INn, Inn+1, ..., INn+m) to optical outputs (OUT1, ..., OUTn, OUTn+1, ..., OUTn+m) of an optical switch (OS) thereby generating outgoing optical signals, characterized in that said optical switching method additionally comprises the steps of:

delaying at least a subset of said outgoing optical signals with predetermined delay times to obtain delayed optical signals;

controlling said routing and said predetermined delay times so as to provide synchronised outgoing optical signals, each one of said synchronised outgoing optical signals being associated with a respective one of said incoming optical signals, said synchronized optical signals being provided by routing each incoming optical signal either to one of said optical delay units or directly to one of said optical outputs.

12. An optical switching method according to claim 11 characterized in that said predetermined delay times are an integer multiple of a predetermined time interval (T).

13. An optical switching method according to claim 12 characterized in that said predetermined fiber line length is defined by the fiber line length of an optical fiber line which is such that the transport delay of an optical signal over the optical fiber line equals said predetermined time interval (T).

14. An optical switching method according to claim 11 characterized in that said step of delaying at least a subset of said outgoing optical signals with said predetermined delay times is realised by optical fiber lines with a fiber line length being an integer multiple of a predetermined fiber line length.

15. An optical switching method according to claim 11 characterized in that said predetermined fiber line length is defined by the fiber line length of an optical fiber line which is such that the transport delay of an optical signal over the optical fiber line equals a predetermined time interval (T).

16. An optical switching method according to claim 11 characterized in that said optical switching method additionally comprises the step of coupling back at least part of said delayed optical signals to one of said optical inputs (IN$n$+1, ..., IN$n$+$m$).

17. An optical hitless protection switching method realized in an optical node of an optical network and comprising the step of routing incoming optical signals from optical inputs (IN1, ..., IN$n$, IN$n$+1, ..., IN$n$+$m$) to optical outputs (OUT1, ..., OUT$n$, OUT$n$+1, ..., OUT$n$+$m$) of an optical switch (OS) thereby generating outgoing optical signals, characterized in that said optical hitless protection switching method comprises the steps of:
an optical switching method including delaying at least a subset of said outgoing optical signals with predetermined delay times to obtain delayed optical signals; and
controlling said routing and said predetermined delay times so as to provide synchronised outgoing optical signals, each one of said synchronised outgoing optical signals being associated with a respective one of said incoming optical signals, said synchronized optical signals being provided by routing each incoming optical signal either to one of said optical delay units or directly to one of said optical outputs;
and wherein the optical hitless protection switching method further includes the step of selecting a plurality of said synchronised outgoing optical signals corresponding to a plurality of identical incoming optical signals.

18. An optical protection switching module included in an optical node of an optical network characterized in that said optical protection switching module consists of the cascade connection of an optical switch arrangement (OSA), each said optical switch arrangement for inclusion in an optical node of the optical network and including an optical switch (OS) with optical inputs (IN1, ..., IN$n$, IN$n$+1, ..., IN$n$+$m$) and optical outputs (OUT1, ..., OUT$n$, OUT$n$+1, ..., OUT$n$+$m$), said optical switch (OS) being adapted for routing incoming optical signals from said optical inputs (IN1, ..., IN$n$, IN$n$+1, ..., IN$n$+$m$) to said optical outputs (OUT1, ..., OUT$n$, OUT$n$+1, ... OUT$n$+$m$) thereby generating outgoing optical signals, wherein the optical switch arrangement (OSA) additionally includes:

an optical delay device (ODD) coupled to said optical switch (OS) and generating delayed optical signals, said optical delay device (ODD) including optical delay units (ODU1, ..., ODU$m$), each one of said optical delay units (ODU1, ..., ODU$m$) being coupled to a respective optical output in at least a subset of said optical outputs (OUT$n$+1, ..., OUT$n$+$m$) and being adapted to delay an outgoing optical signal of said outgoing optical signals provided at said respective output with a predetermined delay time thereby generating one of said delayed optical signals;

a control unit (CTRL) coupled to said optical switch (OS) and to said optical delay device (ODD) to control said routing and said predetermined delay time respectively so as to provide synchronised outgoing optical signals, each one of said synchronised outgoing optical signals being associated with a respective one of said incoming optical signals, said synchronized optical signals being provided by routing each incoming optical signal either to one of said optical delay units or directly to one of said optical outputs;

wherein the optical protection switching module is further characterized by a plurality of optical selectors, each optical selector being adapted to select under control of a second control unit, one out of a plurality of said outgoing optical signals or said delayed optical signals generated by said optical switch arrangement (OSA), thereby generating a selected optical signal, said plurality of said outgoing optical signals or of said delayed optical signals corresponding to a plurality of identical incoming optical signals.

19. An optical hitless protection switching module (OHPSW) included in an optical node of an optical network characterized in that said optical hitless protection switching module (OHPSW) includes the cascade connection of an optical switch arrangement (OSA), wherein the optical switching arrangement is for inclusion in an optical node of the optical network and including an optical switch (OS) with optical inputs (IN1, ..., IN$n$, IN$n$+1, ..., IN$n$+$m$) and optical outputs (OUT1, ..., OUT$n$, OUT$n$+1, ..., OUT$n$+$m$), said optical switch (OS) being adapted for routing incoming optical signals from said optical inputs (IN1, ..., IN$n$, IN$n$+1, ..., IN$n$+$m$) to said optical outputs (OUT1, ..., OUT$n$, OUT$n$+1, ..., OUT$n$+$m$) thereby generating outgoing optical signals, wherein the optical switch arrangement (OSA) additionally includes:

an optical delay device (ODD) coupled to said optical switch (OS) and generating delayed optical signals, said optical delay device (ODD) including optical delay units (ODU1, ..., ODU$m$), each one of said optical delay units (ODU1, ..., ODU$m$) being coupled to a respective optical output in at least a subset of said optical outputs (OUT$n$+1, ..., OUT$n$+$m$) and being adapted to delay an outgoing optical signal of said outgoing optical signals provided at said respective output with a predetermined delay time thereby generating one of said delayed optical signals;

a control unit (CTRL) coupled to said optical switch (OS) and to said optical delay device (ODD) to control said routing and said predetermined delay time respectively so as to provide synchronised outgoing opTical signals, each one of said synchronised outgoing optical signals being associated with a respective one of said incoming optical signals, said synchronized optical signals being provided by routing each incoming optical signal either to one of said optical delay units or directly to one of said optical outputs;

and wherein the optical hitless protection module further includes a plurality of optical selectors, each optical selector (SEL) being adapted to select under control of a second control unit, one out of a plurality of said synchronised outgoing optical signals generated by said optical switch arrangement (OSA), thereby generating a selected optical signal, said plurality of synchronised outgoing optical signals corresponding to a plurality of identical incoming optical signals.

20. An optical protection switching method realized in an optical node of an optical network and comprising the step of routing incoming optical signals from optical inputs (IN1, ..., IN$n$, In$n$+1, ..., IN$n$+$m$) to optical outputs (OUT1, ..., OUT$n$, OUT$n$+1, ..., OUT$n$+$m$) of an optical switch (OS) thereby generating outgoing optical signals, characterized in that said optical projection switching method comprises the steps of an optical switching method including the steps of:

delaying at least a subset of said outgoing optical signals with predetermined delay times to obtain delayed optical signals; and controlling said routing and said predetermined delay times so as to provide synchronised outgoing optical signals, each one of said synchronised outgoing optical signals being associated with a respective one of said incoming optical signals, said synchronized optical signals being provided by routing each incoming optical signal either to one of said optical delay units or directly to one of said optical outputs;

and wherein the optical protection switching method further includes the step of selecting a plurality of said outgoing optical signals or said delayed optical signals corresponding to a plurality of identical incoming optical signals.

* * * * *

UNITED STATES PATENT AND TRADEMARK OFFICE
CERTIFICATE OF CORRECTION

PATENT NO : 5,978,120
DATED : Nov. 2, 1999
INVENTOR(S) : Dumortier

Page 1 of 2

It is certified that error appears in the above-identified patent and that said Letters Patent hereby corrected as shown below:

At column 9, line 22, "waith" should read --wait--.

At column 10, line 48, "selects" should read --select,--.

At column 10, line 57 after "(IN1, ... " --,-- should be inserted.

At column 10, line 58 "In$n$+1 should read --IN$n$+1--.

At column 11, line 33 "In$n$+1" should read --IN$n$+1--

At column 11, line 65 after "OUT$n$+1, ... " --,-- should be inserted.

UNITED STATES PATENT AND TRADEMARK OFFICE
CERTIFICATE OF CORRECTION

PATENT NO : 5,978,120
DATED : Nov. 2, 1999
INVENTOR(S) : Dumortier

It is certified that error appears in the above-identified patent and that said Letters Patent is hereby corrected as shown below:

At column 12, line 59, "opTical" should read --optical--.

At column 13, line 11, "In$n$+1" should read -- In$n$+1,--.

At column 13, line 15, "projection" should read --protection--.

Signed and Sealed this

Thirtieth Day of May, 2000

Attest:

Attesting Officer

Q. TODD DICKINSON

Director of Patents and Trademarks